United States Patent
Harris et al.

(10) Patent No.: US 12,517,819 B2
(45) Date of Patent: Jan. 6, 2026

(54) FAST LBA/PBA TABLE REBUILD BY SKIPPING READ OF METADATA OF LBA BIN THAT IS NOT MAPPED

(71) Applicant: SK Hynix NAND Product Solutions Corp., Rancho Cordova, CA (US)

(72) Inventors: James R. Harris, Chandler, AZ (US); Benjamin Walker, Chandler, AZ (US); Mateusz Kozlowski, Gdansk (PL); Kapil Karkra, Chandler, AZ (US); Artur Paszkiewicz, Gdansk (PL)

(73) Assignee: SK Hynix NAND Product Solutions Corp., Rancho Cordova, CA (US)

( * ) Notice: Subject to any disclaimer, the term of this patent is extended or adjusted under 35 U.S.C. 154(b) by 208 days.

(21) Appl. No.: 17/987,553

(22) Filed: Nov. 15, 2022

(65) Prior Publication Data
US 2023/0076365 A1 Mar. 9, 2023

(51) Int. Cl.
*G06F 12/02* (2006.01)
(52) U.S. Cl.
CPC .. *G06F 12/0246* (2013.01); *G06F 2212/7201* (2013.01)
(58) Field of Classification Search
CPC .............. G06F 12/0246; G06F 2212/7201
See application file for complete search history.

(56) References Cited

U.S. PATENT DOCUMENTS

| 8,407,449 B1* | 3/2013 | Colon ................ G06F 12/0246 711/159 |
| 10,228,878 B1* | 3/2019 | Mateescu ............ G06F 3/0679 |
| 2021/0103518 A1* | 4/2021 | Ju ..................... G06F 12/0246 |

OTHER PUBLICATIONS

Chung, Tae-Sun, et al., "A survey of Flash Translation Layer", Elsevier, Journal of Systems Architecture 55 (2009) 332-343, Mar. 23, 2009, 12 pages.
Park, Jong-Hyeok, et al., "A Crash Recovery Scheme for a Hybrid Mapping FTL in NAND Flash Storage Devices", MDPI, electronics, Published Feb. 1, 2021, 20 pages.

* cited by examiner

*Primary Examiner* — Chie Yew
(74) *Attorney, Agent, or Firm* — Haley Guiliano LLP

(57) ABSTRACT

A method is described. The method includes constructing a bitmap having a first dimension organized into bins of logical block addresses (LBA bins) and a second dimension organized into bins of physical block addresses (PBA bins). Coordinates of the bitmap indicate whether respective physical blocks of non volatile memory within one or more SSDs that fall within a particular PBA bin are being mapped to by an LBA that falls within a particular one of the LBA bins. The method includes using the bitmap during a rebuild of an LBA bin of an LBA/PBA table to avoid reading meta data for physical blocks that are not mapped to by an LBA that falls within the LBA bin.

17 Claims, 7 Drawing Sheets

FAST LBA/PBA TABLE REBUILD BY SKIPPING READ OF METADATA OF LBA BIN THAT IS NOT MAPPED

BACKGROUND

With the continued expansion of the storage capacity of flash memory devices, it is becoming more difficult for a solid state drive (SSD) to recover from a power failure owing to the sheer size of the internal state of the SSD during its operation which, in turn, is driven by the SSD's storage capacity.

FIGURES

Figure 1:
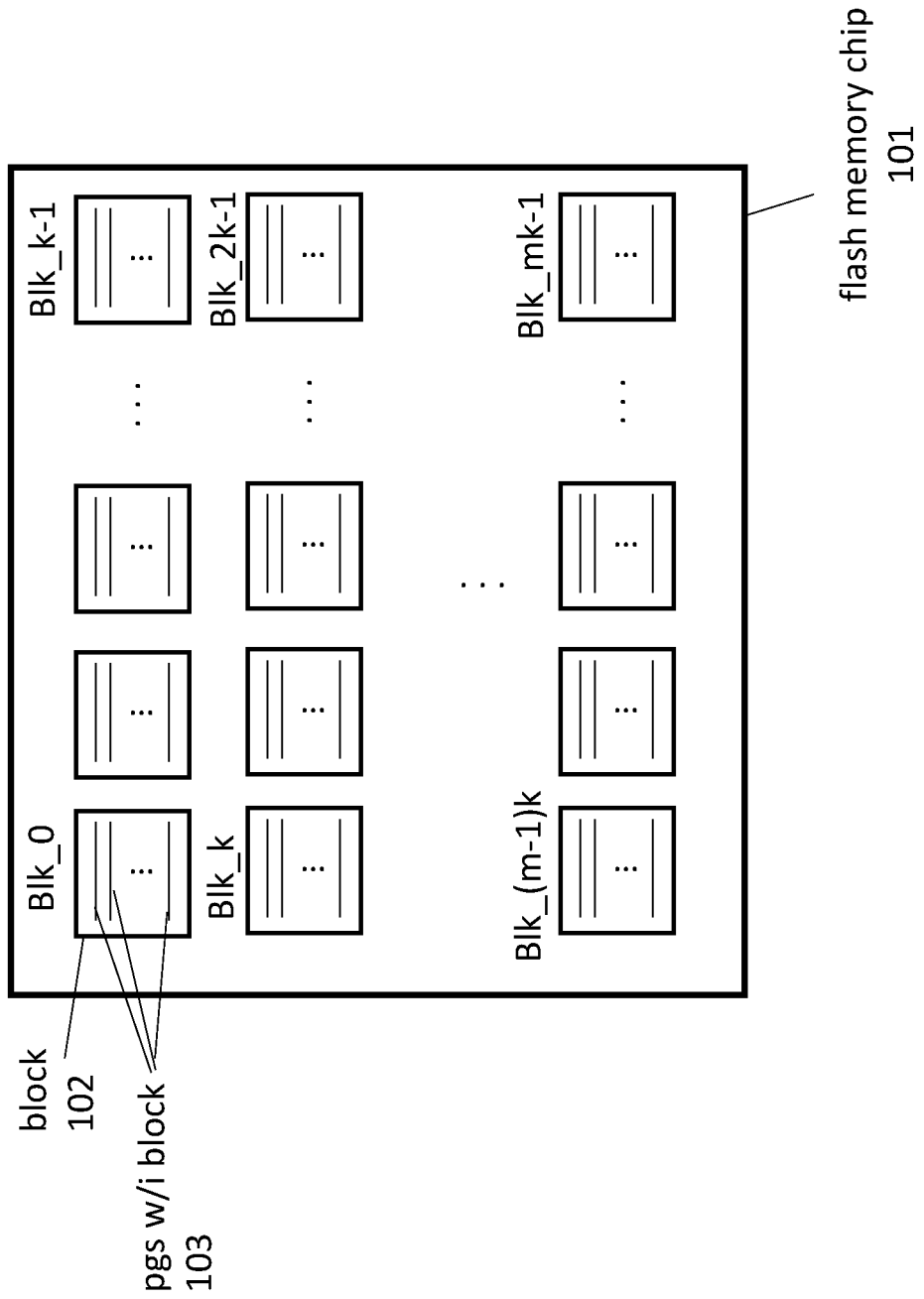
Figure 2:
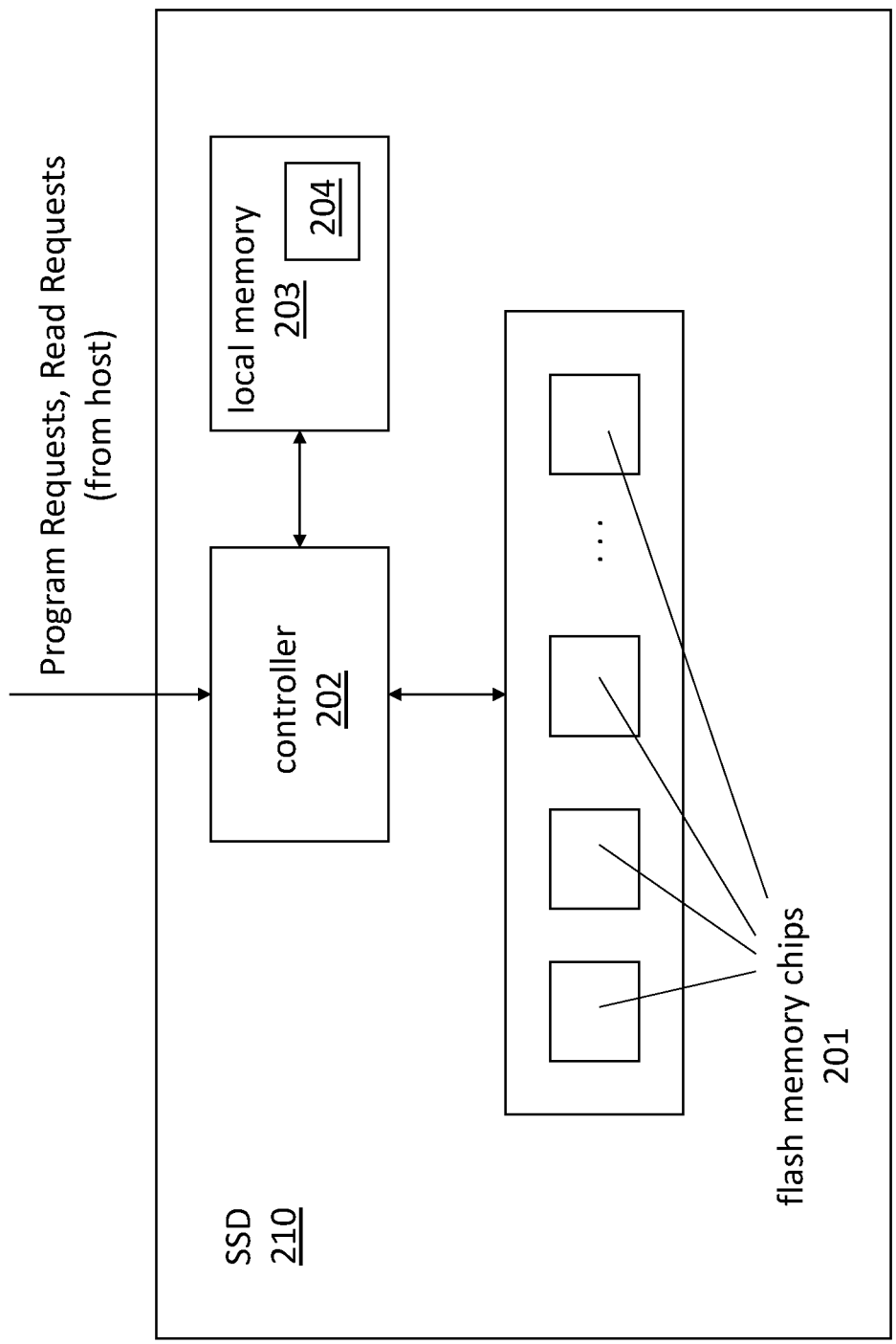
Figure 3:
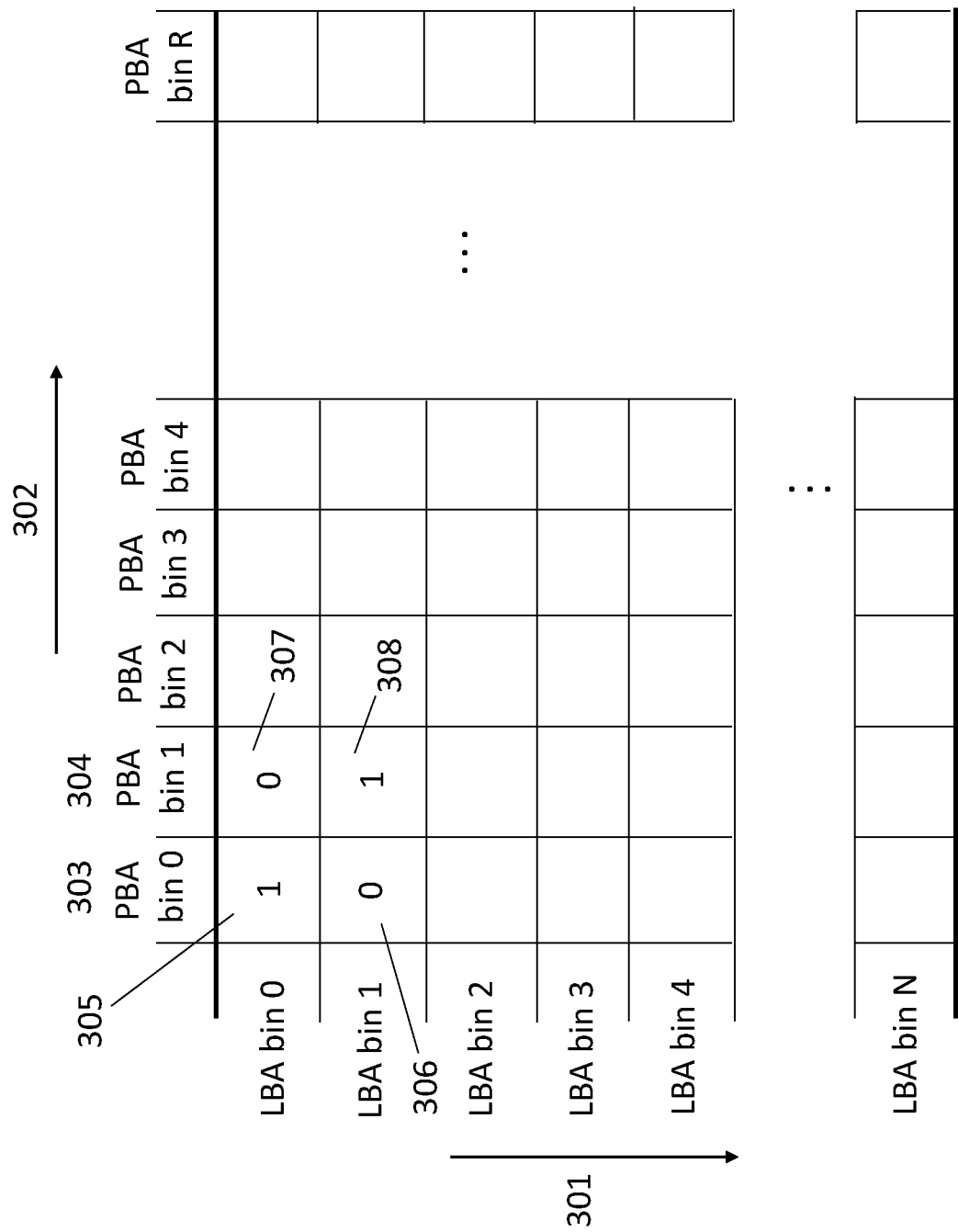
Figure 4:
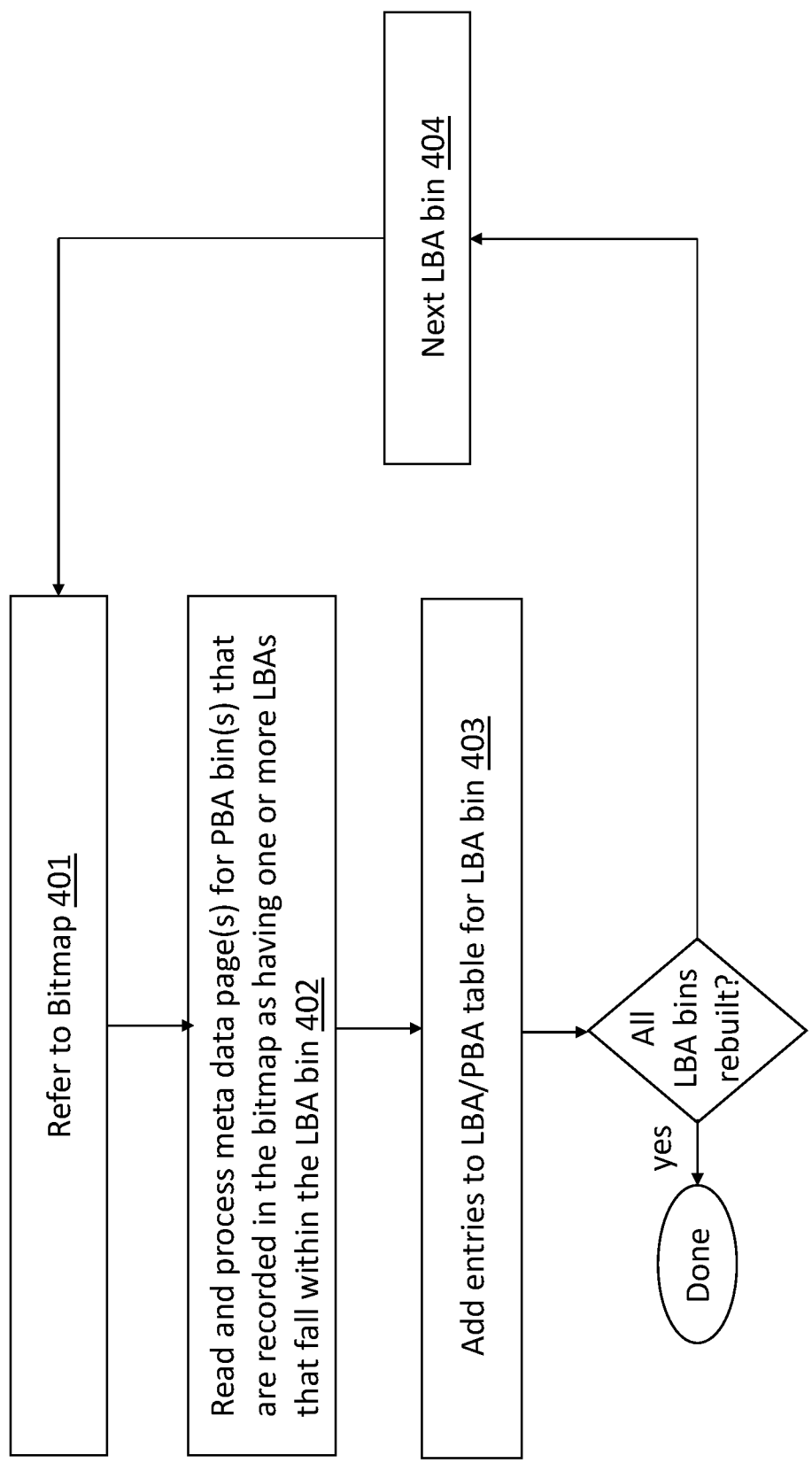
Figure 5:
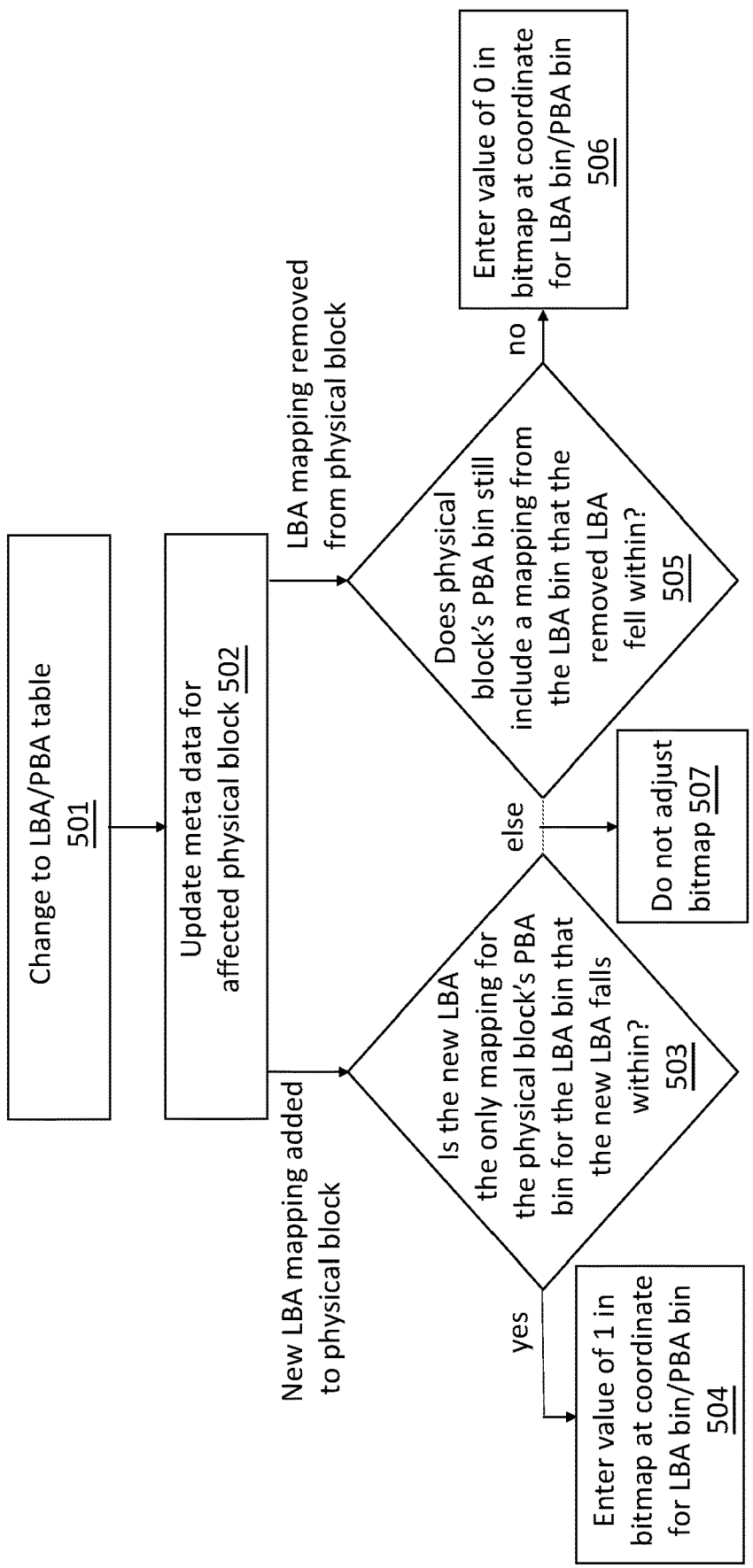
Figure 6:
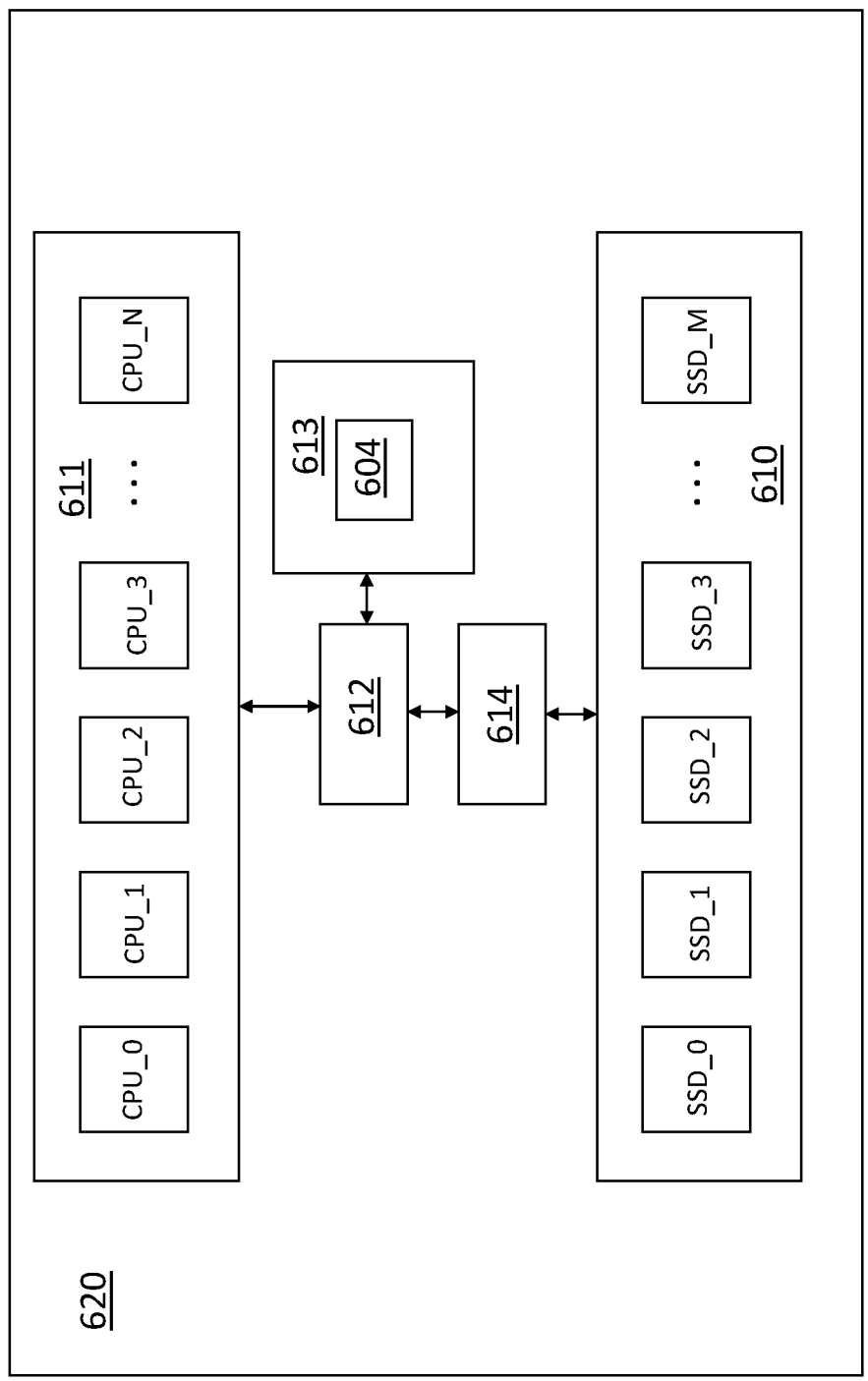
Figure 7:
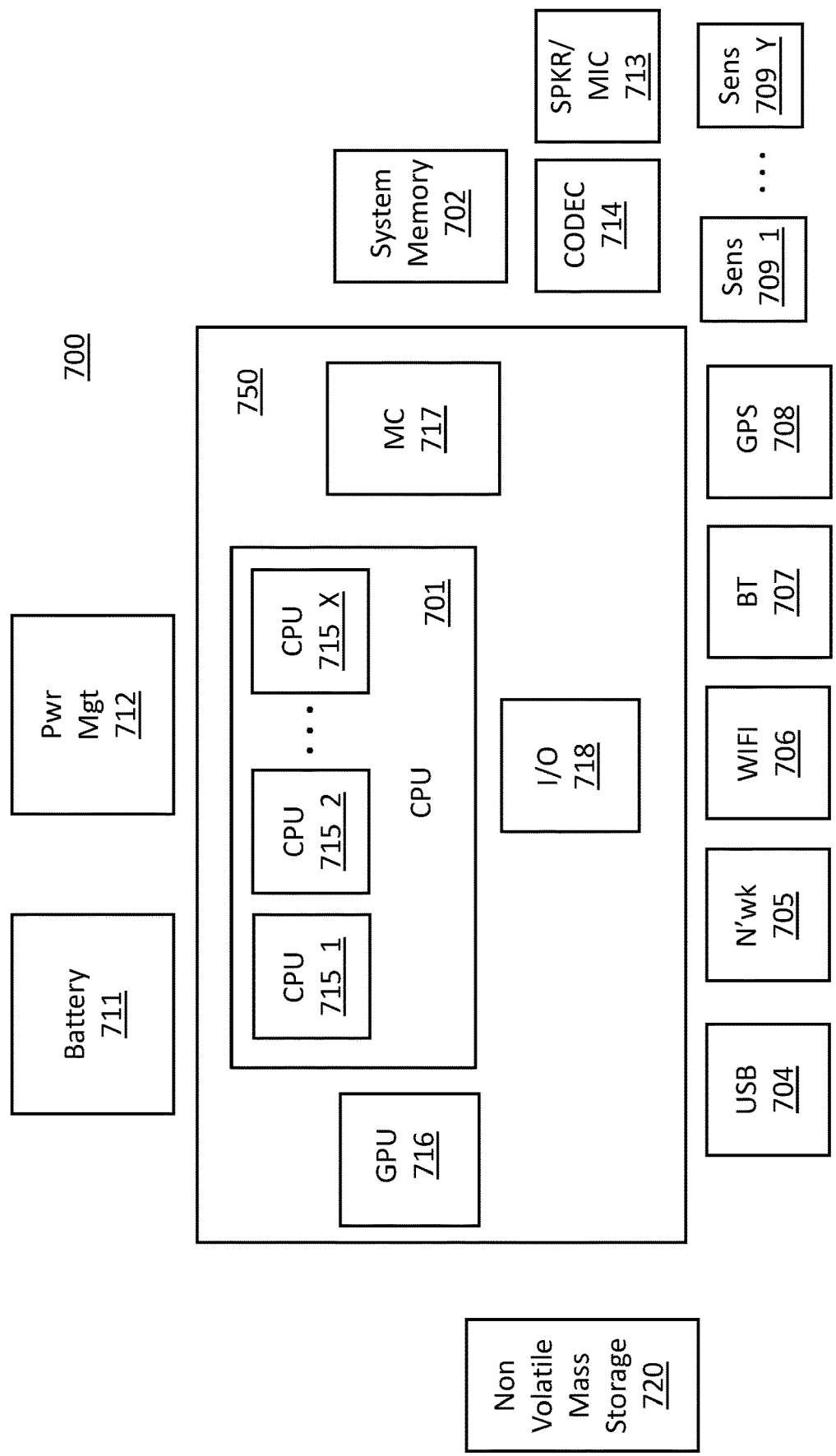

FIG. 1 depicts a flash memory chip;
FIG. 2 depicts a solid state drive (SSD);
FIG. 3 depicts a bitmap;
FIG. 4 depicts an LBA/PBA rebuild process;
FIG. 5 depicts a bitmap update process;
FIG. 6 depicts a host based LBA/PBA table implementation;
FIG. 7 depicts a computing system.

DETAILED DESCRIPTION

FIG. 1 shows a high level view of the architecture 101 of a flash memory chip. As observed in FIG. 1, the flash memory chip includes multiple blocks of flash memory cells that each contain multiple pages of data (for ease of drawing only one block 102 is labeled and only the pages 103 within that block 102 are labeled). During nominal operation, erases are performed at block granularity whereas programming (writing) is performed at page granularity.

Thus, with respect to an erase operation, a particular block is a target of the erase operation and all pages within the block are erased in performing the erase operation. By contrast, with respect to a program operation, any particular page within a block is a target of the program operation and a page's worth of contents are written to the page in performing the program operation. Reads can be performed at page granularity (or less than page granularity if desired).

Traditionally, block sizes are hundreds or pages and page sizes are kilobytes (e.g., 2048 bits) of random customer data with additional bytes of meta data per page (e.g., 64 bytes of meta data per page).

FIG. 2 shows a high level view of the architecture of a solid state drive (SSD) 210. As observed in FIG. 2 the solid state drive includes multiple flash memory chips 201 that posses the flash memory chip architecture 101 of FIG. 1 discussed above. The solid state drive also includes a controller 202 and associated local dynamic random access memory 203 (DRAM) that the controller operates out of The controller 202 receives requests (e.g., program requests, read requests, etc.) from a host system such as a larger computer or storage unit that the SSD plugs into.

The controller 202 can be configured to use the local memory 203 as caching and/or queuing resources for the SSD's pages as the controller 202 processes the requests it receives and the flash memory chips 201 receive pages of program data and provide pages of read data. The controller 202 also maintains a logical block address (LBA) to physical block address (PBA) translation table 204 in the local memory 203.

Here, the requests received from the host include a host-side address. The LBA/PBA table 204 maps the LBA to the address of specific physical block in a particular one of the flash memory chips 201 (which corresponds to a physical block address (PBA)). When the controller 202 receives a program or read request from the host, the controller uses the LBA portion of the request's host side address as a lookup parameter into the LBA/PBA table 204 to fetch the corresponding PBA which identifies the particular block in the particular flash memory chip that actually contains the page that is targeted by the request.

As a consequence of wear leveling, garbage collection, and/or other data maintenance operations performed by the controller 202, pages of data within a same block are frequently moved from one physical block to another physical block. The controller updates the LBA/PBA table 204 (with a new PBA) as an ancillary operation to reflect the new block location of the pages.

During nominal operation of the SSD, the aforementioned meta data for the pages within a particular physical block in flash memory includes block centric meta data that identifies the LBA that is currently mapped to the block. As such, whenever the controller newly assigns a particular PBA to a particular LBA, the controller updates the meta data within the block identified by the PBA to include the LBA. Thus, ideally, at all times, each block within the SSD's flash memory chips 201 that is currently being mapped to by an LBA/PBA entry in the LBA/PBA table 204 contains meta data that identifies the LBA that is mapping to the block.

With the LBA/PBA table 204 being implemented in the volatile DRAM local memory 203, the LBA/PBA table 204 will be lost if the SSD 201 suffers a power outage. During the bring-up of the SSD 201 after the power is restored, the controller 202 is responsible for rebuilding the LBA/PBA table 204 as it existed at the moment of the power outage.

In order to rebuild the LBA/PBA table 204, the controller 202 scrolls through the meta data within the blocks of the flash memory devices 201 and extracts the LBA information found within each block to identify which LBA was mapping to which block at the moment when the power outage occurred.

Generally, any LBA can be mapped to any PBA. Thus, the meta data of any block can contain any LBA. With each new LBA that is recovered from the meta data scrolling process, the controller inserts a new entry in the PBA/LBA table that is under construction. The new entry includes the LBA and the PBA of the block that contained that LBA. In theory, after all the meta has been scrolled through for all blocks of all flash memory chips 201 in the SSD 210, the LBA/PBA table 204 should be completely rebuilt.

A problem however is the amount of space available in the local memory 203 to build the table and receive the meta data. Generally, there is not enough space in local memory 203 to hold the complete LBA/PBA table 204 and all of the meta data from all of the blocks. As such, the LBA/PBA table 204 is rebuilt in sections or "bins", where, each bin corresponds to only a slice of the LBA addressing space. That is, the total LBA addressing space is broken down into multiple contiguous ranges and the LBA/PBA table is rebuilt one continuous range (bin) at a time.

In this case, the meta data is scrolled through and only LBAs in the current bin being rebuilt are looked for in the meta data. A new entry is added to the table for each LBA in the current bin that is found in the meta data. Unfortunately, the meta data is completely scrolled through for each bin. Thus, if the total LBA addressing space is broken down into, e.g., 32 bins, the meta data from all blocks within all flash memory chips is completely scrolled through 32 times (once for each bin) to completely rebuild the LBA/PBA table. The reading of the same meta data 32 times over consumes large amounts of time that delays the reconstruction of the LBA/PBA table and the recovery of the SSD from the power failure.

A solution, referring to FIG. 3, is to form a bitmap during operation of the SSD having one axis 301 that corresponds to the LBA bins and another axis 302 that corresponds to bins of physical blocks. In various embodiments, just as each LBA bin corresponds to a range of LBAs, each PBA bin corresponds to a range of PBAs.

As described in more detail further below, the bitmap is used to identify groups of PBAs that are not mapped to by any LBAs within a particular LBA bin. Thus, when a particular LBA bin is being rebuilt, the meta data can be ignored (not read) for those physical blocks whose corresponding group of PBAs in the bitmap are not mapped to by any LBA within the LBA bin under construction. The avoidance of reading and processing the meta data for such groups of PBAs can greatly reduce the amount of time consumed rebuilding the LBA/PBA table for the bin. Such time savings made over the reconstruction of all bins can extrapolate to complete LBA/PBA table construction in significantly less time than the current approach.

In various embodiments the bitmap is continuously updated and stored in a special location in flash memory 201 so that its information is not lost during the power failure. Upon bring up of the SSD after the power failure, the controller 202 reads the bitmap to avoid reading irrelevant meta data as described just above.

FIG. 3 depicts an exemplary embodiment 300 where each location along the horizontal axis represents a group of PBAs. In various embodiments the PBAs within a same group are contiguous addresses but other embodiments can have sets of disjointed PBAs within a same group. For ease of explanation FIG. 3 assumes the PBAs are contiguous within each group. As such, increments along the vertical axis 301 are made with different ranges of LBAs (LBA bins) and increments along the horizontal axis 302 are made with different ranges of PBAs (PBA bins).

As observed in FIG. 3, the first PBA bin 303 corresponds to a first range of PBAs (e.g., PBAs 0 through 255), the second PBA bin 304 corresponds to a second range of PBAs (e.g., PBAs 256 through 511), etc. Here, for any PBA bin whose corresponding physical blocks include at least one physical block that is mapped to by an LBA within a particular LBA bin, a 1 is recorded in coordinate location of the bitmap that corresponds to the PBA bin and the LBA bin. By contrast, for any PBA bin whose corresponding physical blocks do not include any physical block that is mapped to by an LBA within a particular LBA bin, a 0 is recorded in coordinate location of the bitmap that corresponds to the PBA bin and the LBA bin.

In the particular example of FIG. 3, the meta data of the physical blocks that correspond to the first PBA bin 303 identifies at least one mapping from an LBA that falls within LBA bin 0. As such, a "1" is recorded in coordinate location 305. By contrast, the meta data of these same physical blocks (that correspond to the first PBA bin 303) do not identify any mapping from an LBA that falls within LBA bin 1. As such, a "0" is recorded in coordinate location 306.

Contra-wise, the meta data of the physical blocks that correspond to the second PBA bin 304 do not identify any mapping from an LBA that falls within LBA bin 0. As such, a "0" is recorded in coordinate location 307. By contrast, the meta data of these same physical blocks (that correspond to the second PBA bin 304) identifies at least one mapping from an LBA that falls within LBA bin 1. As such, a "1" is recorded in coordinate location 308. The remainder of the bitmap is filled out accordingly for each unique combination (bitmap coordinate) of LBA bin and PBA bin.

Thus, the 0s in the bitmap for any particular LBA bin "map out" the ranges of PBAs (PBA bins) whose corresponding physical blocks are not mapped to by an LBA within the LBA bin. When the controller 202 is rebuilding a particular LBA bin of the LBA/PBA table 204, the controller 202 is free to "skip over" the meta data of the physical blocks for those PBA bins having a 0 recorded in the bitmap for the LBA bin under construction (the controller only reads the meta data for the PBA bins having a 1 recorded in the bitmap). If the bitmap records a significant number of 0s for the PBA bins for the particular LBA bin under construction, the controller will avoid reading and processing large amounts of meta data that does not include any LBA within the LBA bin under construction. As such, the time consumed rebuild the LBA/PBA 204 for the particular LBA bin will be greatly reduced as compared to the current approach.

In further embodiments, the number of physical blocks per PBA bin is determined from the page size within a physical block and the amount of information needed to identify which LBA is mapping to a particular physical block. For example, if 8 bytes are needed per physical block to record which LBA is mapping to the physical block, and, if there are 2048 bytes per page in the SSD's flash memory chips, then the LBA information for the 256 different physical blocks of a same PBA bin can be recorded on a single page (256×8=2048).

Each page having the LBA information for a particular PBA bin of the bitmap, in various embodiments, is stored in flash memory 201 in addition to the bit map and as additional meta data to the nominal meta data that is stored for each physical block's pages. In various embodiments more than one page of LBA information can be maintained for each PBA bin. Here, the controller can read and process all pages for the PBA bin when a 1 is recorded in the bitmap for the particular LBA bin being constructed. For ease of discussion the remainder of the discussion will assume there is one page of LBA information per PBA bin.

If the bitmap is organized, e.g., such that each PBA bin represents a group of 256 physical blocks, then, each PBA bin corresponds to one page of meta data that can be stored in flash memory that identifies the respective LBAs mappings for 256 blocks. Here, a 1 or 0 is recorded in the bitmap depending on whether the page of meta data for a particular PBA bin includes an LBA that falls within the particular LBA bin for each LBA bin along the vertical axis 301.

For example, FIG. 3 corresponds to an embodiment where the page that is stored for the first PBA bin 303 (e.g., having the meta data for blocks in the PBA range 0-255) includes an LBA that falls within LBA bin 0 but does not include an LBA that falls within LBA bin 1. Likewise, the page that is stored for the second PBA bin 304 (e.g., having the meta data for blocks in the PBA range 256-511) does not include an LBA that falls within LBA bin 0 but does include an LBA that falls within LBA bin 1.

Importantly, during recovery from a power failure, the controller 202 only reads the pages for those PBA bins having a 1 recorded in the bitmap.

For example, referring to the example of FIG. 3, when building the LBA/PBA table 204 for LBA bin 0, the controller 202 will read the page for PBA bin 0 but will not read the page for PBA bin 1. Upon reading the page for PBA bin 0, the controller 202 processes the page and identifies those blocks/PBAs within PBA bin 0 that are being mapped to by an LBA that falls within LBA bin 0 and then adds the corresponding LBA/PBA entries to the LBA/PBA table 204 under construction. Here, the page identifies, for each PBA in PBA bin 0, what LBA is mapping to the PBA. Thus LBA/PBA table entries can be constructed directly from the page's content.

The controller then proceeds to only read and process the pages for those PBA bins having a 1 recorded for LBA bin 0 after which the LBA bin 0 portion of the LBA/PBA table 204 has been reconstructed. After the LBA bin 0 portion of the LBA/PBA table 204 has been reconstructed, the controller proceeds to perform the same process, but for LBA bin 1. The process then continues until all LBA bins have been reconstructed in the LBA/PBA table 204.

Ideally, a significant number of entries in the bitmap contain 0s which translates into substantial time savings because the reading and processing of large amounts of irrelevant data was avoided.

The collection of PBA bins reflected on any single bitmap can be any of: 1) a portion of the blocks that reside on a same flash memory chip (in which case there are multiple bitmaps for each flash memory chip in the SSD); 2) all of the blocks that reside on a same flash memory chip (in which case there is one bitmap for every flash memory chip in the SSD); 3) a portion of blocks that reside on each of multiple memory flash memory chips; etc.

In various embodiments, LBA bins are defined according to bands. According to one definition of a band, a band is the group of blocks located at the same position on each of the flash memory chips within the SSD. Here, each band corresponds to its own contiguous slice of LBA space and, e.g., the respective LBA slices from multiple bands can define an LBA bin.

FIG. 4 shows a process for rebuilding an LBA/PBA table as described above. As observed in FIG. 4, e.g., upon restoration of power to the SSD after a power failure, the controller reads the bitmap and refers to it 401. For a first LBA bin (e.g., LBA bin 0), the controller then reads and processes the pages for the PBA bins that the bitmap indicates include at least one mapping from an LBA within the LBA bin 402. The controller also adds entries into the LBA/PBA table under construction for those LBAs discovered in the pages that fall within the first LBA bin 403. The process then continues for each of the following LBA bins 404 until all LBA bins have been processed.

FIG. 5 shows a process for updating a bitmap during nominal operation of an SSD. As observed in FIG. 5, upon a change 501 being made to the LBA/PBA table 204, the affected block's nominal meta data is updated to reflect the change as is the meta data page for the bitmap PBA bin that the affected block's PBA falls into 502.

Here, the change can generally be of two types: 1) the affected block has received a new LBA mapping; or, 2) the affected block no longer has any LBA mapping to it. Changes that fall into 1) above can occur if a particular LBA value that was mapping to the affected block is replaced with a new LBA value, or, the affected block was not previously mapped to by any LBA and has just now been newly mapped to with an LBA. A change like that of 2) above can occur, e.g., if the block was recently erased and is now being configured to be programmed again with new write information.

Any of these changes can affect the bitmap. Thus, the controller 202 therefore reads the meta data page for the affected block's PBA bin and determines if the change to the block's mapping warrants a change to the bitmap. If the change is of type 1) above, the controller 202 changes the bitmap value 504 for the applicable LBA bin and PBA bin coordinate from a 0 to a 1 if the new LBA mapping is the only LBA mapping for the PBA bin that falls within the applicable LBA bin 503. By contrast, if the change is of type 2) above, the controller 202 changes the bitmap value 506 for the applicable LBA bin and PBA bin coordinate from a 1 to a 0 if the PBA bin's meta page does not include any LBA mappings from an LBA that falls within the applicable LBA bin 505. In all other cases the bitmap remains unchanged 507.

In various embodiments the controller 202 is implemented with dedicated hardwired circuitry (e.g., one or more hardwired state machines), programmable circuitry (e.g., field programmable gate array (FPGA)), circuitry that executes some form of program code such as the SSD's firmware (e.g., processor) or any combination of these. The controller 202 in various embodiments is designed and/or otherwise configured to execute any/all of the processes described above.

FIG. 6 shows a host computer system 620 having numerous SSDs 610 that are integrated (e.g., plugged) into the system. As observed in FIG. 6 the host computer system 620 includes a plurality of (e.g., general purpose CPU) processing cores 611, a main memory controller 612, a main memory 613 and an I/O control hub 614. The SSDs 610 are communicatively coupled to the I/O control hub 614. The main memory controller 612 is architecturally between the main memory 613 and the I/O control hub 614, and the main memory 613 and the processing cores 611. Pages and/or blocks of information are passed between the main memory 613 and the SSDs 610 through the I/O control hub 614.

The processing cores 611 execute the system's software. Instructions and data used by the software is read from main memory 613 by main memory controller 612 and passed to the cores 611. Data created by the software is passed from the cores 611 to the main memory controller 612 and written into the main memory 613.

In the particular system 620 of FIG. 6, the LBA/PBA translation table(s) 604 for the SSDs 610 are managed by software executing on the processing cores 611 rather than the respective controllers within the SSDs 610. That is, software executing on one or more of the processing cores 611 comprehends the physical blocks within the SSDs 610 and assigns the SSD's physical blocks to specific LBAs by entering corresponding LBA/PBA entries in the LBA/PBA translation table(s) 604. Application software executing on the processing cores 611 refers to memory locations with LBAs and the LBAs are converted to PBAs from the table(s) in main memory 613. The physical blocks are then accessed by passing PBAs to the SSDs which access the PBAs directly (the SSDs do not perform LBA/PBA translation).

Managing the LBA/PBA at the host level in this fashion can improve program/write efficiencies to the SSDs. For example, programs/writes are performed at granularities that are higher than single page level. For example, programs/writes are performed at 64 KB granularity (rather than 4 KB granularity) by combining (e.g., 32) physical pages into a single mass of program/write data. In some implementations a layer of fast, non-volatile storage (not shown in FIG. 6, such as byte addressable, three dimensional monolithically arrayed resistive storage cell memory chips (e.g., Optane™ memory from Intel Corporation) is inserted architecturally "above" the SSDs 610 and is the location where smaller pages are effectively combined to form larger units of SSD write/program data.

Alternatively or in combination, the physical storage space of the SSDs 610 are organized into different zones where each zone corresponds to a group of sequentially programmed blocks within an SSD. Implementation of such zones can prevent scattered storage of an application software program's pages across the various blocks/chips within an SSD (e.g., by assigning applications to their own zones) which can reduce the write activity of one application affecting the storage access afforded to another application, and/or can reduce write amplification, etc.

With the LBA/PBA table(s) 604 being implemented in main memory 613, the table(s) 604 can be lost in the case of a power failure because main memory 613, like controller local memory within the SSDs, is composed of volatile DRAM memory.

Nevertheless, the LBA/PBA re-build methodology, described at length above with respect to a single SSD, can be expanded to include the rebuild of LBA/PBA tabular information 604 whose PBAs are associated the flash memory chips of multiple SSDs (rather than a single SSD). That is, the PBA bins of any bitmap can refer to PBAs whose corresponding physical blocks span across multiple SSDs rather than being confined to just a single SSD. In the context of multiple SSDs instead of a single SSD, the processing of block meta data and the processing and construction of meta data pages that identify which LBA points to which PBA within a particular PBA bin can be processed as described at length above. Such meta data pages and the bitmap(s) can be stored in a single one of the SSDs 610 or in multiple ones of the SSDs 610 depending on implementation. Depending on implementation, a single PBA bin in a bitmap can refer to blocks in a same SSD or in multiple SSDs.

Here such methodologies can be performed by software and/or firmware executing on the processing cores 611 such as device driver software, virtual machine monitor or hypervisor software, virtual machine software, operating system instance software, or any combination therefore. Such software can also control the nominal LBA/PBA table entries of the LBA/PBA table(s) 604 during the nominal runtime of the system 620.

Note that although the above discussion of FIG. 6 is directed to an implementation where the PBAs as maintained by the host system in the LBA/PBA table 604 in main memory 613 are actual PBAs of blocks within the SSDs 610, in other embodiments these "host PBAs" are actually LBAs relative to the SSDs 610. That is, the respective controllers within the SSDs continue to maintain and manage LBA/PBA translation internally within the SSDs 610. In essence, the "host PBAs" that are sent to the SSDs 610 from main memory 613 by the host are nevertheless viewed as "LBAs" by the SSDs.

The "host PBAs" received by the SSDs are converted to actual PBAs (actual physical addresses of actual physical blocks within the SSDs 610) by the SSDs' internal controllers and the respective LBA/PBA translation tables that they maintain within their local, internal SSD memory. The rebuild mechanism described at length above is straightforward to realize in such a system because the bitmap is mapping bins of higher level block addresses (host LBAs) to bins of lower level block addresses (host PBAs). Internal translation from host PBAs to actual PBAs within the SSDs happens transparently to the bitmap and does not affect the accuracy of the bitmap or its ability to avoid reading irrelevant meta data during rebuild of table 604 as described above.

Although embodiments above have emphasized flash memory based SSDs 210, 610, in various embodiments, the SSDs 210, 610 include fast non volatile memory chips (e.g., Optane™ memory as mentioned above) along with or in place of flash memory chips.

FIG. 7 depicts a basic computing system. The basic computing system 700 can include a central processing unit (CPU) 701 (which may include, e.g., a plurality of general purpose processing cores 715_1 through 715_X) and a main memory controller 717 disposed on a multi-core processor or applications processor, main memory 702 (also referred to as "system memory"), a display 703 (e.g., touchscreen, flat-panel), a local wired point-to-point link (e.g., universal serial bus (USB)) interface 704, a peripheral control hub (PCH) 718; various network I/O functions 705 (such as an Ethernet interface and/or cellular modem subsystem), a wireless local area network (e.g., WiFi) interface 706, a wireless point-to-point link (e.g., Bluetooth) interface 707 and a Global Positioning System interface 708, various sensors 709_1 through 709_Y, one or more cameras 710, a battery 711, a power management control unit 712, a speaker and microphone 713 and an audio coder/decoder 714.

An applications processor or multi-core processor 750 may include one or more general purpose processing cores 715 within its CPU 701, one or more graphical processing units 716, a main memory controller 717 and a peripheral control hub (PCH) 718 (also referred to as I/O controller and the like). The general purpose processing cores 715 typically execute the operating system and application software of the computing system. The graphics processing unit 716 typically executes graphics intensive functions to, e.g., generate graphics information that is presented on the display 703. The main memory controller 717 interfaces with the main memory 702 to write/read data to/from main memory 702. The power management control unit 712 generally controls the power consumption of the system 700. The peripheral control hub 718 manages communications between the computer's processors and memory and the I/O (peripheral) devices.

Other high performance functions such as computational accelerators, machine learning cores, inference engine cores, image processing cores, infrastructure processing unit (IPU) core, etc. can also be integrated into the computing system.

Each of the touchscreen display 703, the communication interfaces 704-707, the GPS interface 708, the sensors 709, the camera(s) 710, and the speaker/microphone codec 713, 714 all can be viewed as various forms of I/O (input and/or output) relative to the overall computing system including, where appropriate, an integrated peripheral device as well (e.g., the one or more cameras 710). Depending on implementation, various ones of these I/O components may be integrated on the applications processor/multi-core processor 750 or may be located off the die or outside the package of the applications processor/multi-core processor 750. The computing system also includes non-volatile mass storage 720 which may be the mass storage component of the system which may be composed of one or more non-volatile mass storage devices (e.g., hard disk drive, solid state drive, etc.). The non-volatile mass storage 720 may be implemented with any of solid state drives (SSDs), hard disk drive (HDDs), etc.

Embodiments of the invention may include various processes as set forth above. The processes may be embodied in program code (e.g., machine-executable instructions). The program code, when processed, causes a general-purpose or special-purpose processor to perform the program code's processes. Alternatively, these processes may be performed by specific/custom hardware components that contain hard wired interconnected logic circuitry (e.g., application specific integrated circuit (ASIC) logic circuitry) or programmable logic circuitry (e.g., field programmable gate array (FPGA) logic circuitry, programmable logic device (PLD)

logic circuitry) for performing the processes, or by any combination of program code and logic circuitry.

Elements of the present invention may also be provided as a machine-readable medium for storing the program code. The machine-readable medium can include, but is not limited to, floppy diskettes, optical disks, CD-ROMs, and magneto-optical disks, FLASH memory, ROMs, RAMs, EPROMs, EEPROMs, magnetic or optical cards or other type of media/machine-readable medium suitable for storing electronic instructions.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

The invention claimed is:

1. An apparatus, comprising:
  logic circuitry to:
    construct a bitmap having a first dimension organized into bins of logical block addresses (LBA bins) and a second dimension organized into bins of physical block addresses (PBA bins), wherein coordinates of the bitmap indicate whether respective physical blocks of non-volatile memory fall within a particular PBA bin are being mapped to by a logical block address (LBA) that falls within a particular one of the LBA bins,
    use the bitmap, during a rebuild of an LBA bin of an LBA/PBA table, to avoid reading meta data, stored in the non-volatile memory, for physical blocks that are not mapped to by an LBA that falls within the LBA bin, and
    update the bitmap when a change in the LBA/PBA table results in all physical blocks, in the non-volatile memory, whose respective PBAs fall within a first particular PBA bin to not be mapped to by an LBA that falls within a first particular LBA bin, the update to change a value of the bitmap located in a coordinate of the bitmap that corresponds to the first particular PBA bin and the first particular LBA bin.

2. The apparatus of claim 1 wherein the logic circuitry is to store the bitmap in the non-volatile memory.

3. The apparatus of claim 1 wherein the logic circuitry is to store information, for the bitmap, identifies which LBAs are mapping to the respective physical blocks, in the non-volatile memory, whose respective PBAs fall within a particular one of the PBA bins.

4. The apparatus of claim 3 wherein the information is contained in one or more non-volatile memory pages for each PBA bin.

5. The apparatus of claim 1 wherein an LBA bin is defined as one or more bands within an SSD.

6. An apparatus, comprising:
  logic circuitry to:
    construct a bitmap having a first dimension organized into bins of logical block addresses (LBA bins) and a second dimension organized into bins of physical block addresses (PBA bins), wherein coordinates of the bitmap indicate whether respective physical blocks of non-volatile memory fall within a particular PBA bin are being mapped to by a logical block address (LBA) that falls within a particular one of the LBA bins,
    use the bitmap, during a rebuild of an LBA bin of an LBA/PBA table, to avoid reading meta data, stored in the non-volatile memory, for physical blocks that are not mapped to by an LBA that falls within the LBA bin, and
    update the bitmap when a change in the LBA/PBA table results in one physical block amongst all physical blocks, in the non-volatile memory, whose respective PBAs fall within a first particular PBA bin to be mapped to by an LBA that falls within a first particular LBA bin, the update to change a value of the bitmap located in a coordinate of the bitmap that corresponds to the first particular PBA bin and the first particular LBA bin.

7. A computing system, comprising:
  a plurality of processors;
  a main memory controller coupled to the plurality of processors;
  a main memory coupled to the main memory controller, the main memory to store an LBA/PBA table;
  an I/O control hub coupled to the main memory controller;
  a plurality of SSDs coupled to the I/O control hub; and
  program code stored on a storage medium, the program code to cause at least one of the processors to perform a method, comprising:
    constructing a bitmap having a first dimension organized into bins of logical block addresses (LBA bins) and a second dimension organized into bins of physical block addresses (PBA bins), wherein coordinates of the bitmap indicate whether respective physical blocks of memory chips within at least one of the SSDs that fall within a particular PBA bin are being mapped to by a logical block address (LBA) that falls within a particular one of the LBA bins,
    using the bitmap, during a rebuild of an LBA bin of an LBA/PBA table, to avoid reading meta data, stored in the non-volatile memory, for physical blocks that are not mapped to by an LBA that falls within the LBA bin, and
    updating the bitmap when a change in the LBA/PBA table results in all physical blocks, in the non-volatile memory, whose respective PBAs fall within a first particular PBA bin to not be mapped to by an LBA that falls within a first particular LBA bin, the updating to change a value of the bitmap located in a coordinate of the bitmap that corresponds to the first particular PBA bin and the first particular LBA bin.

8. The computing system of claim 7 wherein the method further comprises storing the bitmap in an SSD of the plurality of SSDs.

9. The computing system of claim 7 wherein the method further comprises storing information, for the bitmap, identifies which LBAs are mapping to the respective physical blocks, in the non-volatile memory, whose respective PBAs fall within a particular one of the PBA bins.

10. The computing system of claim 9 wherein the information is contained in one or more non-volatile memory pages for each PBA bin.

11. The computing system of claim 7 wherein the PBA bins are bins of host side PBAs and the plurality of SSDs internally translate the host side PBAs to actual PBAs of blocks within the SSDs.

12. A computing system, comprising:
  a plurality of processors;

a main memory controller coupled to the plurality of processors;

a main memory coupled to the main memory controller, the main memory to store an LBA/PBA table;

an I/O control hub coupled to the main memory controller;

a plurality of SSDs coupled to the I/O control hub; and program code stored on a storage medium, the program code to cause at least one of the processors to perform a method, comprising:

constructing a bitmap having a first dimension organized into bins of logical block addresses (LBA bins) and a second dimension organized into bins of physical block addresses (PBA bins), wherein coordinates of the bitmap indicate whether respective physical blocks of memory chips within at least one of the SSDs that fall within a particular PBA bin are being mapped to by a logical block address (LBA) that falls within a particular one of the LBA bins, using the bitmap, during a rebuild of an LBA bin of an LBA/PBA table, to avoid reading meta data, stored in the non-volatile memory, for physical blocks that are not mapped to by an LBA that falls within the LBA bin, and updating the bitmap when a change in the LBA/PBA table results in one physical block amongst all physical blocks, in the non-volatile memory, whose respective PBAs fall within a first particular PBA bin to be mapped to by an LBA that falls within a first particular LBA bin, the updating to change a value of the bitmap located in a coordinate of the bitmap that corresponds to the first particular PBA bin and the first particular LBA bin.

13. A non-transitory machine readable storage medium containing program code that when processed by at least one processor causes the at least one processor to perform a method, comprising:

constructing a bitmap having a first dimension organized into bins of logical block addresses (LBA bins) and a second dimension organized into bins of physical block addresses (PBA bins), wherein coordinates of the bitmap indicate whether respective physical blocks of non volatile memory within one or more SSDs that fall within a particular PBA bin are being mapped to by a logical block address (LBA) that falls within a particular one of the LBA bins;

using the bitmap, during a rebuild of an LBA bin of an LBA/PBA table, to avoid reading meta data, stored in the non-volatile memory, for physical blocks that are not mapped to by an LBA that falls within the LBA bin; and updating the bitmap when a change in the LBA/PBA table results in all physical blocks, in the non-volatile memory, whose respective PBAs fall within a first particular PBA bin to not be mapped to by an LBA that falls within a first particular LBA bin, the updating to change a value of the bitmap located in a coordinate of the bitmap that corresponds to the first particular PBA bin and the first particular LBA bin.

14. The non-transitory machine readable storage medium of claim 13 wherein the method further comprises storing information, for the bitmap, identifies which LBAs are mapping to the respective physical blocks, in the non-volatile memory, whose respective PBAs fall within a particular one of the PBA bins.

15. The non-transitory machine readable storage medium of claim 14 wherein the information is contained in one or more non volatile memory pages for each PBA bin.

16. The non-transitory machine readable storage medium of claim 13 wherein the PBA bins are bins of host side PBAs and the plurality of SSDs internally translate the host side PBAs to actual PBAs of blocks within the SSDs.

17. A non-transitory machine readable storage medium containing program code that when processed by at least one processor causes the at least one processor to perform a method, comprising:

constructing a bitmap having a first dimension organized into bins of logical block addresses (LBA bins) and a second dimension organized into bins of physical block addresses (PBA bins), wherein coordinates of the bitmap indicate whether respective physical blocks of non volatile memory within one or more SSDs that fall within a particular PBA bin are being mapped to by a logical block address (LBA) that falls within a particular one of the LBA bins;

using the bitmap, during a rebuild of an LBA bin of an LBA/PBA table, to avoid reading meta data, stored in the non-volatile memory, for physical blocks that are not mapped to by an LBA that falls within the LBA bin; and updating the bitmap when a change in the LBA/PBA table results in one physical block amongst all physical blocks, in the non-volatile memory, whose respective PBAs fall within a first particular PBA bin to be mapped to by an LBA that falls within a first particular LBA bin, the updating to change a value of the bitmap located in a coordinate of the bitmap that corresponds to the first particular PBA bin and the first particular LBA bin.

* * * * *